United States Patent [19]

Imaizumi et al.

[11] Patent Number: 5,366,549
[45] Date of Patent: Nov. 22, 1994

[54] METHOD FOR FABRICATING FIBER-REINFORCED SLAG GYPSUM CEMENT-BASED, LIGHTWEIGHT SET ARTICLES

[75] Inventors: Shokichi Imaizumi, Tokyo; Tsuyoshi Aoyama, Houya; Nagao Hori, Tokorozawa; Katsumi Takenami, Tsurugashima; Kiyoshi Koibuchi, Yokohama; Youich Ishikawa, Tokyo; Seiji Kazama, Kawanishi; Koji Nasu, Nishinomiya, all of Japan

[73] Assignees: Kyowa Giken Co., Ltd.; Takeda Chemical Industries, Ltd., both of Osaka; Dai-Ichi Cement Co., Ltd., Kanagawa; Naigai Technos Corporation; Obayashi Corporation, both of Osaka, all of Japan

[21] Appl. No.: 217,025

[22] Filed: Mar. 24, 1994

Related U.S. Application Data

[63] Continuation of Ser. No. 997,637, Dec. 18, 1992, abandoned, which is a continuation of Ser. No. 715,483, Jun. 14, 1991, abandoned.

Foreign Application Priority Data

Nov. 28, 1990 [JP] Japan .................. 2-322431

[51] Int. Cl.$^5$ .............................................. C04B 7/14
[52] U.S. Cl. .................................... 106/715; 106/695; 106/711; 106/723; 106/782; 106/789; 264/333
[58] Field of Search ............... 106/682, 711, 715, 723, 106/679, 680, 695, 696, 782, 772, 776, 789, 790; 264/333, DIG. 43

[56] References Cited

U.S. PATENT DOCUMENTS

| | | | |
|---|---|---|---|
| 1,995,540 | 3/1935 | Harrison | 106/88 X |
| 2,880,100 | 3/1959 | Ulfstedt | 106/682 X |
| 4,146,402 | 3/1979 | Kira et al. | 106/711 X |
| 4,157,263 | 6/1979 | Gaines et al. | 106/695 |
| 4,166,749 | 9/1979 | Sterrett et al. | 106/711 X |
| 4,187,118 | 2/1980 | Nakagawa et al. | 106/723 X |
| 4,229,393 | 10/1980 | Wesche et al. | 106/733 X |
| 4,266,980 | 5/1981 | Chudo et al. | 106/715 X |
| 5,030,289 | 7/1991 | Sattler et al. | 106/711 X |
| 5,108,679 | 4/1992 | Rirsch et al. | 106/679 X |

OTHER PUBLICATIONS

*Design and Control of Concrete Mixtures,* Portland Cement Association, 1988, pp. 30, 31, 53–57 and 70.
Chemical Abstract—"Lightweight Inorganic Hardened Product" Mireshita et al. JP 54116023 (Sep. 10, 1979) Japan Matsushita Electric Works Ltd.

*Primary Examiner*—Karl Group
*Assistant Examiner*—Paul Marcantoni
*Attorney, Agent, or Firm*—Wenderoth, Lind & Ponack

[57] ABSTRACT

A method is provided for making a fiber-reinforced slag gypsum cement lightweight hardened product. The method consists essentially of mixing (1) from 5 to 140 parts by weight of aggregates having a maximum size of not larger than 2000 μm to (2) 100 parts by weight of a mixture which comprises 100 parts by weight of Portland cement, (3) from 20 to 350 parts by weight of slag fine powder which has a fineness ranging from 6,000 to 12,000 cm$^2$/g as Blaine's specific surface area, (4) from 0 to 20 parts by weight of lime, (5) from 20 to 100 parts by weight of calcium aluminate and gypsum fine powder, (6) 0.01 to 1.5 parts of a setting retardant; mixing water, prefoamed foams and reinforcing fibers with the mixture to obtain a slurry; subjecting the slurry to molding to obtain a molded product; removing the molded product to obtain a hardened product; and curing the hardened product with steam. In the method of the invention, the slurry sets and hardens within a short time, permitting the hardened product to be immediately removed from a mold.

16 Claims, 1 Drawing Sheet

METHOD FOR FABRICATING FIBER-REINFORCED SLAG GYPSUM CEMENT-BASED, LIGHTWEIGHT SET ARTICLES

This application is a continuation application of now abandoned application Ser. No. 07/997,637, filed Dec. 18, 1992, which was a continuation application of now abandoned application Ser. No. 07/715,483 filed Jun. 14, 1991.

BACKGROUND OF THE INVENTION

1. Field of The Invention

This invention relates to the art of fiber-reinforced slag gypsum cement and more particularly, to a method for fabricating fiber-reinforced slag gypsum cement-based, lightweight set articles or products which are useful as outside and inside wall materials of buildings and which have good water resistance, durability and fire resistance.

2. Description of The Prior Art

Hitherto known lightweight building materials have included gypsum building materials, typical of which are gypsum boards utilizing setting of hemihydrate gypsum and anhydrous gypsum. Gypsum/slag and gypsum/slag/cement composite building materials have now been put on the market. Moreover, there have been proposed quick-setting cement compositions composed of Portland cement, alumina cement, gypsum and lime. Recently the composition has been used to make woody cement sheets or plates. Besides, there are known autoclaved lightweight building materials, typical of which is ALC (autoclaved lightweight concrete).

Conventional gypsum building materials make use of setting and hardening characteristics of hemihydrate gypsum, with an attendant advantage that they can be shaped or molded and processed within a short time. However, since the gypsum building material is mainly composed of gypsum, there arises the problem that the water resistance is poor. To improve the water resistance, gypsum/slag or gypsum/slag/cement composite building materials are now commercially sold. However, in order that these composite building materials are molded and processed within a short time, a substantial amount of hemihydrate gypsum has to be employed, leaving the problem of the water resistance. On the contrary, when the amount of hemihydrate gypsum is reduced, the molding and processing within a short time is not possible although the problem of the water resistance can be solved.

The use of quick-hardening cement compositions composed of Portland cement, alumina cement, gypsum and lime enables one to mass-produce within a short time building materials with a great degree of freedom with respect to the shape and the thickness. However, the building material produced from the above four ingredients is disadvantageous in that when the amounts of the four ingredients are varied only slightly, the dimensional stability will become poor or the long-term durability will be degraded. For the continuous mass production of conventional cement building materials, a sheet making process is used or curing in an autoclave is necessary. In the former process, it will be difficult to produce building materials whose thickness exceeds 20 mm. In the latter case, there are involved problems that site processability or workability such as cutting, nailing and the like is not good with a vast cost for the equipment.

We proposed in Japanese Patent Application No. 1-139647 a method for fabricating a novel fiber-reinforced slag gypsum cement-based lightweight set product. However, it was found as a result of further studies that the building material set forth in the above application was not satisfactory with respect to the dimensional stability in outdoor exposure and coarse bubbles (with a diameter of not smaller than 1 mm) involved during kneading and molding of slurries.

SUMMARY OF THE INVENTION

We paid attention to the quick setting and hardening phenomenon, at normal temperatures, of a composition composed of Portland cement, calcium aluminate, gypsum, lime and a fine powder of slag. For the purpose of improving the dimensional stability and the durability of the set article or product of the composition, a great number of tests were conducted wherein extensive aggregates are added to the composition along with a setting regulator, foams and reinforcing fibers. Moreover, for the purpose of removing coarse foams caught up into the composition during the course of kneading and molding of the slurry, intensive studies were made on a procedure wherein the slurry was vibrated and injected with compressed air. As a result, we accomplished a method for fabricating a fiber-reinforced slag gypsum cement lightweight set article or product.

According to the invention, there is provided a method which comprising adding from 5 to 140 parts by weight of aggregates having a maximum size of not larger than 2000 μm to 100 parts by weight of a mixture which comprises 100 parts by weight of Portland cement, from 20 to 350 parts by weight of slag fine powder, from 0 to 20 parts by weight of lime, and from 20 to 100 parts by weight of calcium aluminate and gypsum fine powder in total provided that a ratio by weight of the gypsum fine powder and the calcium aluminate is in the range of 0.5 to 2.0:1, further adding from 0.01 to 1.5 parts by weight of a setting regulator to the mixture, mixing water, foams and reinforcing fibers with the mixture to obtain a slurry, subjecting the slurry to molding, removing the resultant molded product, and curing the removed product with steam.

The slag fine powder is one which is obtained by milling and classifying a blast furnace granulated slag which is characterized by a fineness which is in the range of 6,000 to 12,000 $cm^2/g$ in terms of the Blaine's specific surface area.

The calcium aluminate may be CA, $CA_2$, $C_3A$, $C_{12}A_7$, $C_{11}A_7 \cdot CaF_2$ or mixtures thereof and is characterized in that the total content of these substances should be not less than 50%.

The gypsum fine powder is characterized in that the fineness is not smaller than 2,500 $cm^2/g$ in terms of the Blaine's specific surface area and an oversize residue of a 88 μ sieve is not larger than 0.5%.

For molding the slurry, the slurry is vibrated at a frequency of 100 to 10,000 V.P.M.

When the slurry is molded, compressed air is blown against the slurry.

The slurry is set and cured for 3 to 60 minutes after the molding and can be immediately removed from a mold and worked.

The steam curing temperature is not higher than 90° C. and the curing is effected at not less than 150° C. . hour.

The cured product has an air-dried specific gravity of 0.4 to 1.5.

The quick-hardening cement composition used in the present invention is a water-hardening material which is characterized by comprising 100 parts by weight of Portland cement, from 20 to 350 parts by weight of slag fine powder, from 0 to 20 parts by weight of lime, and from 20 to 100 parts by weight of calcium aluminate and gypsum fine powder in total provided that the ratio by weight of the gypsum fine powder and the calcium aluminate is in the range of 0.5 to 2.0:1, to which from 0.01 to 1.5 parts by weight of a setting regulator is added.

The setting regulator may be oxycarboxylic acids such as citric acid, malic acid, gluconic acid, 2-ketogluconic acid and the like, and salts thereof. Of these, gluconic acid or its salts are preferred. The setting regulator may be added upon kneading of the slurry or may be used by premixing with the cement composition. If necessary, water reducing agents such as lignin, melamine or naphthalene compounds may be employed.

In the quick-hardening cement composition of the invention, the total of calcium aluminate and gypsum fine powder per 100 parts by weight of Portland cement should be in the range of from 20 to 100 parts by weight, preferably from 40 to 80 parts by weight, and the ratio by weight of the gypsum fine powder and calcium aluminate is in the range of 0.5 to 2.0:1. If the total amount of calcium aluminate and gypsum fine powder exceeds 100 parts by weight, ettringite is formed in excess with the possibility of breakage by expansion along with high production costs. On the contrary, when the total amount is less than 20 parts by weight, the quick-hardening property becomes poor. The reason why the ratio by weight of the gypsum fine powder and the calcium aluminate is in the range of 0.5 to 2.0:1 is that when the ratio by weight is less than 0.5, the development of the strength is not significant whereas the ratio by weight is over 2.0, ettringite is formed in excess with the possibility of breakage by expansion. When the ratio by weight of the gypsum fine powder and the calcium aluminate is within a range of 0.5 to 2.0:1, the quick-hardening property is developed while little shrinkage is involved or expansion is suppressed to such a degree as to not adversely influence the strength.

The calcium aluminate used in the present invention includes, aside from alumina cement, currently commercially sold calcium aluminate minerals, whether amorphous or crystalline. Where commercial products consisting of calcium aluminate and anhydrous gypsum are used, those may be used within ranges defined in the present invention.

Gypsum used in the invention may be anhydrous gypsum, hemihydrate gypsum dihydrate gypsum or mixtures thereof. These may be either natural gypsum or byproducts. If the fineness of the gypsum is coarse, the quick-hardening property and the development of strength become worsened and gypsum may be left as unreacted gypsum, thereby causing poor dimensional stability and expansion crack to be developed. To avoid these problems, the fineness of the gypsum fine powder should be not less than 2,500 $cm^2/g$ in terms of Blaine's specific surface area, preferably not less than 6,000 $cm^2/g$, and the 88 $\mu$ mesh residue is not larger than 0.5%.

For the purpose of shortening the setting time of a slurry prepared from a three-component composition which comprises a combination of Portland cement, calcium aluminate and gypsum fine powder, lime may be further added to the three-component composition. Especially, in the winter season where the outside temperature is low, it is necessarily required to use lime in combination. In the summer season where the outside temperature is high, it is not necessary to use lime in combination. In order to prolong the setting time, a setting regulator such as citric acid is preferably added to control the setting time and tile set strength.

Accordingly, the amount of lime per 100 parts by weight of Portland cement is in the range of from 0 to 20 parts by weight. Slaked lime and unslaked lime may both be used as the lime.

The four-component composition of Portland cement, calcium aluminate, gypsum fine powder and lime are not satisfactory with respect to the long-term durability after steam curing. It has been found that when slag fine powder is further added to the composition, the strength after removal from the mold increases and the strength after steam curing and the long-term durability necessary as a building material is ensured.

The slag fine powder useful in the present invention is, for example, a slag fine powder proposed in Japanese Patent Application No. 59-261083 (Japanese patent publication No. 61-141647), and is one having a Blaine's specific surface area of from 6,000 to 12,000 $cm^2/g$ obtained by classification of an ordinary slag powder having a Blaine's specific surface area of about 4,000 $cm^2/g$. The use of an ordinary slag powder exhibits little increase in strength after steam curing. With the slag fine powder used in the present invention, the use of the slag fine powder in an amount of from 20 to 350 parts by weight per 100 parts by weight of Portland cement ensures a remarkable increase of the strength through steam curing, with high strength after the steam curing.

The aggregates used in the present invention are those which have a maximum size of not larger than 2,000 $\mu$m and which may be either inorganic or organic in nature. If aggregates which contain a maximum size over 2,000 $\mu$m are used, reinforcing fibers are impeded from attachment with the cement matrix. This results not only in little effect of increasing tile bending strength by addition of reinforcing fibers, but also the necessity of increasing the amount of the reinforcing fibers. This eventually leads to a lowering of fluidity of the resultant slurry, making it very difficult to mold. The amount of the aggregates is in the range of from 5 to 140 parts by weight, preferably from 10 to 80 parts by weight, per 100 parts by weight of a five-component mixture consisting of Portland cement, calcium aluminate, gypsum, lime and slag fine powder. The inorganic aggregates include, for example, foamed lightweight aggregates such as MESALITE, SIRUS BALLOON, PEARLITE and the like, "biotite rhyolite lava (koukaseki)", limestone, flyash, slag, zeolite and the like. The organic aggregates include, for example, wood chips, pulp, styrene foams and the like. These are described in examples in more detail.

The molding and curing procedures of a slurry according to the invention are described. The molding process may be any known process except for a sheet-making process and is not critical. For instance, there may be mentioned a casting process, a compression molding process, and an extrusion molding process.

In any molding process used in the practice of the invention, features reside in that a kneaded slurry should be vibrated at a frequency of 100 to 10,000 V.P.M., so that coarse bubbles entangled during the kneading are removed and the slurry is made high in fluidity. Another feature is that the coarse bubbles floated up through the vibrations are removed by blowing compressed air. The temperature of the compressed air may be normal temperatures and hot air with a temperature of from 40° to 60° C. is preferably used. The details are shown in examples. The amount of water in the slurry depends on the manner of molding and should be properly selected for the respective molding processes. The slurry used in the present invention sets and hardens within 3 to 60 minutes after the molding and can be immediately removed and processed.

The hardened product removed and processed within 3 to 60 minutes after the molding is steam cured at temperatures of not higher than 90° C. and not less than 150° C. . hour. If the steam curing temperature exceeds 90° C., ettringite is decomposed. With the steam curing below 150° C. . hour, calcium silicate hydrate will not be formed satisfactorily, not resulting in a strong hardened product. If the ambient temperature is not lower than 10° C., a hardened product can be made by naturally curing over a long term.

The incorporation of foams may be performed by a prefoaming process wherein foams have been preliminarily made or a mix foaming process wherein a foaming agent is added at the time of preparation of the slurry and the slurry is foamed. Any commercially available foaming agent may be used in the practice of the invention without limitation. In this connection, however, aluminium powder inorganic foaming agents undesirably react with gypsum and are not favorable. If necessary, foam stabilizers such as carboxymethyl cellulose (CMC), polyvinyl alcohol (PVA) and the like may be used.

The reason why foams are incorporated is that not only the hardened product is made light in weight, but also it is expected that an expansion pressure as will be caused by formation of ettringite after curing is mitigated to prevent crack from occurring. It is important that the amount of foams incorporated in the product be determined such that an air-dried specific gravity of a hardened product is in the range of from 0.4 to 1.5. When the air-dried specific gravity is over 1.5, the characteristic as a lightweight building material are lost. Below 0.4, the resulting hardened product has a low strength and a large absorption.

The reinforcing fibers used in the present invention may be those fibers which exhibit a high reinforcing effect and include, for example, synthetic fibers, typical of which are vinylon fibers, carbon fibers, alkali-resistant glass fibers, rock wool, asbestos and the like.

According to the method of making a lightweight hardened product, the slurry can be set and hardened within a short time and can be immediately removed from a mold. Subsequently, the molding is subjected to ordinary steam curing to produce a lightweight hardened product within a short time. Thus, there can be provided outer or inner wall materials which have a large freedom with respect to the thick, the configuration and the like, and which are resistant to fire and water and have high durability.

BRIEF DESCRIPTION OF THE DRAWINGS

The sole FIGURE is a schematic view showing a test plant of testing a method for removing coarse bubbles.

PREFERRED EMBODIMENTS OF THE INVENTION

Figure 1:
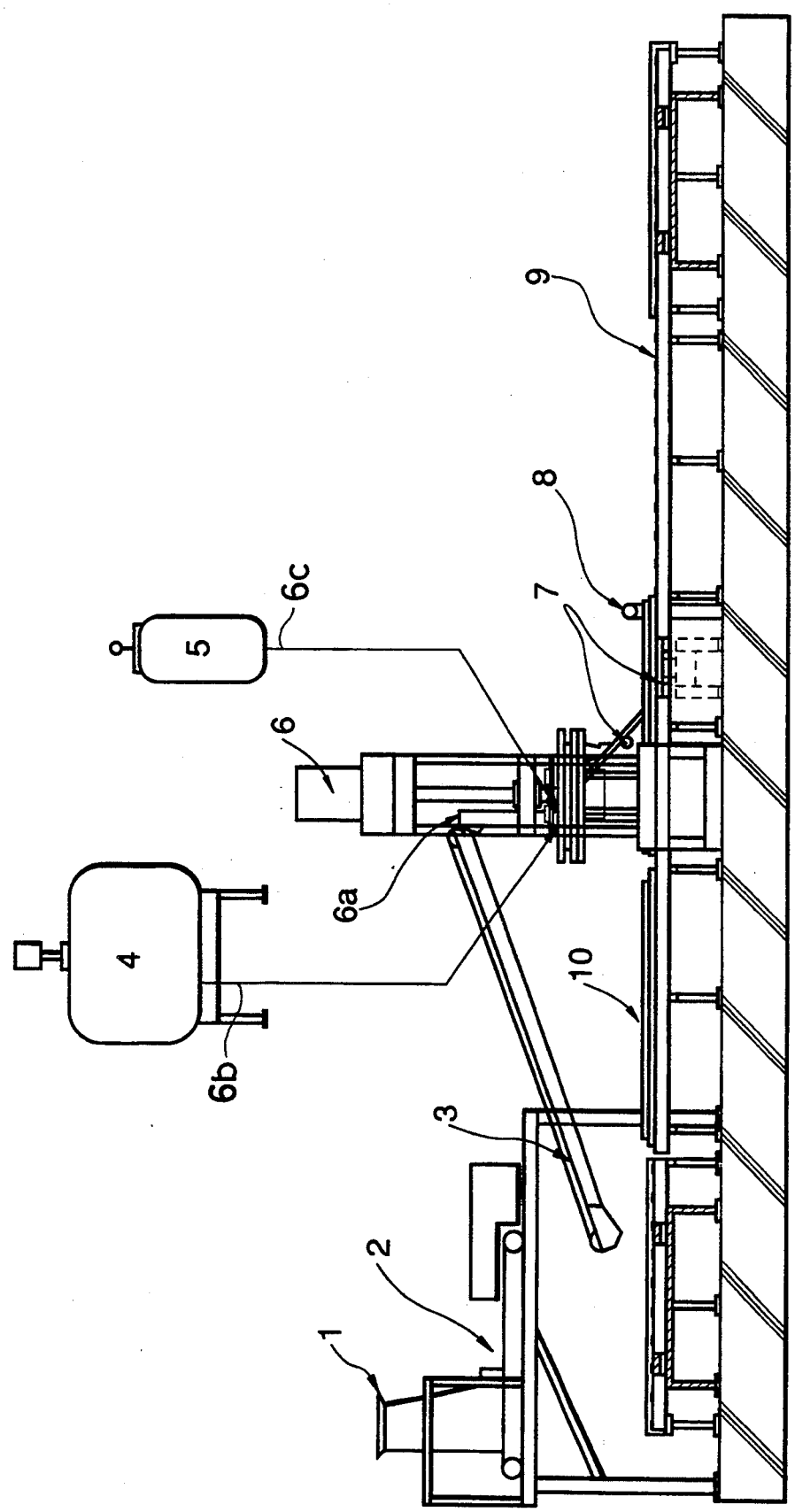

The materials used in examples and abbreviations therefor are shown in Table 1.

TABLE 1

| Material Used | Abbreviation | Remarks |
|---|---|---|
| ordinary Portland cement | PC | Blaine's specific surface area: 3240 $cm^2/g$ |
| calcium aluminate | ES | commercial product: Denka ES |
| anhydrous gypsum | AG | Blaine's specific surface area: 7320 $cm^2/g$ |
| slaked lime | CH | commercial product |
| slag fine powder | FS | Blaine's specific surface area: 8160 $cm^2/g$ |
| setting regulator | CA | citric acid |
| foaming agent | AS | alkylsulfonate |
| foam stabilizer | MC | methyl cellulose |
| vinylon fibers | VF | 15 mm long fibers with 15 deniers |
| PEARLITE M4 | M4 | 1.5–0.5 mm |
| PEARLITE M2 | M2 | 3.0 mm or under |
| MESALITE MS2.5 | MS2.5 | 2.5 mm or under |
| MESALITE MS1.2 | MS1.2 | 1.2 mm or under |
| SIRUS BALLOON | $BO_3$ | 0.2 mm or under |
| flyash | FA | Blaine's specific surface area: 2960 $cm^2/g$ |
| filler | FI | calcium carbonate: 200 mesh or under |
| water reducing agent | MT150 | MITY 150 |

Note: Chemical Components and Mineral Composition of Denka ES

| Chemical Components (%) | | | |
|---|---|---|---|
| $SiO_2$ | $Al_2O_3$ | CaO | $SO_3$ |
| 2.2 | 23.9 | 42.6 | 28.3 |

From the chemical components and the X-ray diffraction analysis, the mineral composition of Denka ES is considered to comprise about 49% of amorphous calcium aluminate, about 49% of $CaSO_4$ and about 2% of others.

EXAMPLE 1

In Example 1, there were checked the influences of the formulations of quick-hardening cement compositions and the amount of citric acid on the setting and hardening properties of slurries. Nine quick-hardening cement compositions indicated as Nos. 1 to 9 in Table 2 were kneaded with hands at a powder-in-water rate of 60% for 30 seconds, after which a thermocouple was immediately inserted into the slurry. A time immediately after the charge of water before the temperature was raised was measured as a set commencing time. In addition, the resultant hardened products were observed. The results are shown in Table 3.

TABLE 2

| | No. | PC | ES | FS | CH | AG | CA | Water Temperature (°C.) |
|---|---|---|---|---|---|---|---|---|
| Comparative Example | 1 | 55 | 15 | 30 | 0 | 0 | 0 | 18 |
| | 2 | 45 | 15 | 30 | 10 | 0 | 0.35 | 18 |
| | 3 | 45 | 15 | 30 | 0 | 10 | 0.25 | 18 |
| Inventive Example | 4 | 55 | 15 | 30 | 0 | 0 | 0.25 | 18 |
| | 5 | 55 | 15 | 30 | 0 | 0 | 0.25 | 8 |
| | 6 | 55 | 15 | 25 | 5 | 0 | 0.25 | 8 |
| | 7 | 55 | 15 | 30 | 0 | 0 | 0.35 | 32 |
| | 8 | 55 | 15 | 25 | 0 | 5 | 0.25 | 18 |
| | 9 | 55 | 15 | 20 | 5 | 5 | 0.25 | 18 |

TABLE 3

| No. | Set Commencing Time (minutes - seconds) | Appearance of Hardened Product (before age of 28 days) |
| --- | --- | --- |
| Comparative Example | | |
| 1 | 1 - 57 | In one-day age, a multitude of cracks produced. Failure in hardening. |
| 2 | 15 - 30 | A small surface hardness in one-day age. |
| 3 | 20 - 12 | In one-day age, expansion cracks produced. |
| Inventive Example | | |
| 4 | 19 - 49 | no defect |
| 5 | 25 - 09 | no defect |
| 6 | 20 - 00 | no defect |
| 7 | 19 - 30 | no defect |
| 8 | 19 - 40 | no defect |
| 9 | 17 - 12 | no defect |

The composition of Comparative Example No. 1 has a very quick set commencing time and involves cracking and failure in hardening, and thus cannot stand use. With the compositions of Comparative Example Nos. 2 and 3, there arises no problem on the set commencing time, but disadvantages are produced in poor development of strength of the hardened product or occurrence of expansion crack. Accordingly, these compositions are not suitable for use in the fabrication method of lightweight hardened products according to the invention.

The composition Nos. 4 to 9 are those of the invention which have a set commencing time within a range of about 17 minutes to 25 minutes sufficient to provide an ample time of from kneading till molding. In addition, the hardened products have good strength without involving any crack. These compositions are suitable for the method of making the lightweight hardened product. More particularly, the comparison between Nos. 4 and 5 reveals that the set commencing time differs depending on the temperature of water used wherein as the water temperature lowers, the set commencing time is longer. With No. 6 where 5% of slaked lime is added, the set commencing time is substantially the same as in No. 4 although the water temperature is as low as 8° C. The comparison between Nos. 4 and 7 reveals that the set commencing times are similar, meaning that even if the water temperatures are different from each other, it will be possible to make the same level of set commencing time by an additional amount of citric acid. From this, it will be found that when a ambient temperature or water temperature varies, the set commencing time can be properly controlled by addition of slaked lime in appropriate amounts and by changing the amount of citric acid. With No. 8 where 5% of anhydrous gypsum is added and No. 9 where slaked lime and anhydrous gypsum are, respectively, added in 5%, the set commencing time and the appearance of the hardened products are good.

EXAMPLE 2

In Example 2, the size and amount of the aggregates which can be used in the present invention were checked.

In Example 2, the quick-hardening cement composition in No. 4 which exhibited good results in Example 1 was used in 100 parts by weight, to which there were added 0.3 parts by weight of citric acid, 1.0 part by weight of a water reducing agent, 0.16 parts by weight of a foam stabilizer, 1.8 parts by weight of vinylon fibers, 5 to 200 parts by weight of various aggregates and 70 to 85 parts by weight of water. Thereafter, foams prepared according to a prefoaming method were added in appropriate amounts, followed by kneading with an omuni mixer for 2 minutes to obtain slurries. Each slurry was cast in a mold or form with a size of 40×40×160 mm and removed from the mold after about 40 minutes. Thereafter, the product was steam cured at 70° C. for 7 hours to obtain lightweight hardened product. The lightweight hardened product was dried at 60° C. for 24 hours and subjected to measurement of physical properties. The results are shown in Table 4.

Comparative Example No. 1 where no aggregate is used has a good specific bending strength, but a multitude of microcracks are produced when the product is subjected outdoor exposure. With Comparative Example No. 2 (PEARLITE M2) and Nos. 3 and 4 (MESALITE MS2.5) each using aggregates having a maximum size of not less than 2,000 μm, the dimensional change is smaller than in Comparative Example No. 1 and microcracks are smaller in number, but the specific bending strength is lowered to about half that of Comparative Example No. 1. On the other hand, Nos. 5 to 17 of the invention which make use of aggregates having a maximum size of not larger than 2,000 μm have a reduced lowering of the specific bending strength and are suppressed from occurrence of microcracks. More particularly, PEARLITE (M4) and SIRUS BALLOON ($BO_3$) which are very lightweight aggregates are used in amount of, at most, about 10 parts by weight per 100 parts by weight of the quick-hardening cement composition in view of the fluidity, moldability and workability of the resulting slurry. With MESALITE (MS1.2) having an intermediate lightweight, the microcracks are decreased in number as the amount is increased. However, in view of the degree in lowering of the specific bending strength, it is preferred that the amount is not larger than 100 parts by weight per 100 parts by weight of the quick-hardening cement composition. Nos. 12 to 17 where flyash (FA) and filler (FI) both in the form of powders which are poor in hydration reactivity, they suppress occurrence of microcracks and permit only a small degree of lowering of the specific bending strength when used in amounts of up to 140 parts by weight per 100 parts by weight of the quick-hardening cement composition.

From the results of above examples, the aggregates used in the present invention should have a maximum size of not larger than 2,000 μm and should be used in amounts of from 5 to 140 parts by weight per 100 parts by weight of the quick-hardening cement composition.

TABLE 4

| | No. | Kind of Aggregate | Amount of Aggregate parts by wt. | Amount of Water parts by wt. | Physical Properties of Slurry | | Physical Properties of Hardened Product After Drying | | | | |
|---|---|---|---|---|---|---|---|---|---|---|---|
| | | | | | Flow (mm) | Specific Gravity (g/cm$^3$) | Dry Specific Gravity (g/cm$^3$) | Bending Strength (kgf/cm$^2$) | Specific Bending Strength (kgf/cm$^2$) | Dimensional Change (%) | Outdoor Exposure Six Months Observation of Microcracks |
| Comparative Example | 1 | nil | nil | 70 | 218 | 0.89 | 0.77 | 52.3 | 67.9 | 0.015 | very large in number |
| | 2 | M2 | 5 | 75 | 190 | 0.89 | 0.77 | 23.9 | 31.0 | 0.012 | large |
| | 3 | MS2.5 | 30 | 75 | 220 | 0.88 | 0.76 | 24.6 | 32.4 | 0.010 | large |
| | 4 | MS2.5 | 60 | 75 | 212 | 0.86 | 0.75 | 20.2 | 26.9 | 0.009 | small |
| Inventive Example | 5 | M4 | 5 | 75 | 193 | 0.87 | 0.77 | 46.5 | 60.4 | 0.012 | slightly large |
| | 6 | M4 | 10 | 80 | 196 | 0.89 | 0.76 | 39.6 | 52.1 | 0.010 | small |
| | 7 | MS1.2 | 60 | 75 | 201 | 0.90 | 0.80 | 40.2 | 50.2 | 0.008 | small |
| | 8 | MS1.2 | 100 | 78 | 202 | 0.91 | 0.80 | 25.1 | 31.4 | 0.005 | very small |
| | 9 | MS1.2 | 140 | 80 | 198 | 0.90 | 0.79 | 16.0 | 20.3 | 0.004 | nil |
| | 10 | BO$_3$ | 5 | 80 | 192 | 0.86 | 0.75 | 46.8 | 62.4 | 0.013 | slightly large |
| | 11 | BO$_3$ | 10 | 85 | 196 | 0.88 | 0.78 | 40.1 | 51.4 | 0.014 | slightly large |
| | 12 | FA | 60 | 75 | 203 | 0.86 | 0.75 | 49.5 | 66.0 | 0.010 | small |
| | 13 | FA | 100 | 78 | 210 | 0.87 | 0.77 | 40.9 | 53.1 | 0.008 | small |
| | 14 | FA | 140 | 85 | 208 | 0.88 | 0.76 | 31.6 | 41.6 | 0.006 | small |
| | 15 | FI | 60 | 75 | 201 | 0.90 | 0.76 | 50.6 | 66.6 | 0.010 | small |
| | 16 | FI | 100 | 78 | 198 | 0.89 | 0.79 | 43.9 | 55.6 | 0.009 | small |
| | 17 | FI | 140 | 85 | 204 | 0.87 | 0.77 | 32.1 | 41.7 | 0.006 | small |

(Note) Specific bending strength = bending strength/dry specific gravity.

Flow is a flow determined according to the method of JIS R5201 and a value measured immediately after the preparation of slurry.

The dimensional change is a percent variation in length of a hardened product which is adjusted to a water content of 40% and placed in a thermostatic chamber at a relative humidity of 60% and a temperature of 20° C. until the dimensional change is equilibrated.

EXAMPLE 3

In Example 3, a working-scale test plant shown in FIG. 1 is used to remove coarse or coarse bubbles (with a diameter of not smaller than about 1 mm) entrained or entangled during kneading and molding of slurry on fabrication of a full-sized panel. The test plant includes a hopper 1 for feeding a powder/fiber mixture obtained by premixing a quick-hardening cement composition, vinylon fibers and aggregates, a continuous weighing and feeding device 2, a foaming machine 5, a tank 4 for feeding an aqueous solution containing predetermined amounts of a foam stabilizer, a water reducing agent and citric acid, a pin mixer 6 wherein the powder/fiber mixture fed from a powder/fiber charge port 6a, the aqueous solution fed from an aqueous solution charge port 6b and foams fed from a foam charge port 6c are kneaded to continuously make a slurry, a vibrator 7 with which the slurry discharged from the pin mixer 6 is continuously vibrated, and a nozzle 8 for blowing compressed air against the slurry. The positions where the slurry is vibrated and where the compressed air is blown are not limited to those shown in the sole figure, but may be any position where there can be expected effects of improving the fluidity of the slurry and of removing the coarse bubbles.

The formulation of the respective ingredients tested in Example 3 is the same as that of No. 15 in Example 2. More particularly, there was used a mixture obtained by permixing 1.8 parts by weight of vinylon fibers and 60 parts by weight of a filler with 100 parts by weight of a quick-hardening cement composition, followed by preparation of an aqueous solution containing a foam stabilizer, a water reducing agent and citric acid as in Example 2 in such a way that water was used in an amount of 75 parts by weight per 100 parts by weight of the quick-hardening cement composition.

Under these conditions, the slurry continuously kneaded and discharged was cast in a mold with a thickness of 30 mm, a width of 900 mm and a length of 1,800 mm. At the time, four panels were fabricated according to different molding procedures including a procedure where vibrations were applied to or were not applied to the slurry, another procedure where compressed air was blown, and a further procedure where the slurry was both vibrated and applied with compressed air. The resulting panels were each removed from the mold after 30 to 60 minutes, subjected to steam curing at 70° C. for 7 hours, and finally dried with hot air at 60° C. for 12 hours to obtain a fiber-reinforced slag gypsum cement lightweight hardened product.

The respective panels were polished on opposite sides thereof to check the number of coarse bubbles (with diameters of from 1 to 3 mm and over 3 mm). The results are shown in Table 5.

TABLE 5

| | Treatment of Slurry | | Number of Coarse Bubble (number/m$^2$) | |
|---|---|---|---|---|
| | Vibration | Compressed Air | 1-3 mm | over 3 mm |
| Comparative Example | no | no | 410 | 185 |
| Invention Example | yes | no | 72 | 30 |
| Invention Example | no | yes | 103 | 22 |
| Invention Example | yes | yes | 15 | 0 |

From the above results, it will be apparent that the vibrations of the slurry and the application of compressed air to the slurry for use in removal of coarse bubbles are very effective.

As shown in the foregoing examples, according to the method of making a lightweight hardened product using the quick-hardening slag gypsum cement composition, the slurry sets and hardens within a short time and can be immediately removed from a mold. Thereafter, the molding can be formed into a lightweight hardened product within a short time by ordinary steam curing. Accordingly, there can be inexpensively provided outer or inner wall materials which have a great degree of freedom with respect to the thickness and shape and which have good resistances to fire and water and good durability. Thus, the method of the invention is very effective in an industrial sense.

What is claimed is:

1. A method for making a fiber-reinforced slag gypsum cement lightweight hardened product which consists essentially of the steps of:

adding from 5 to 140 parts by weight of aggregates having a maximum size of not larger than 2000 μm to 100 parts by weight of a mixture which comprises 100 parts by weight of Portland cement, from 20 to 350 parts by weight of slag fine powder which has a fineness ranging from 6,000 to 12,000 $cm^2/g$ as Blaine's specific surface area, from 0 to 20 parts by weight of lime, and from 20 to 100 parts by weight of calcium aluminate and gypsum fine powder in total, provided that a ratio by weight of the gypsum fine powder and the calcium aluminate is in the range of 0.5 to 2.0:1;

adding from 0.01 to 1.5 parts by weight of a setting retardant to the mixture;

mixing water, prefoamed foams and reinforcing fibers with the mixture to obtain a slurry;

subjecting the slurry to molding to obtain a molded product;

removing the molded product to obtain a hardened product; and curing the hardened product with steam;

wherein the amount of the prefoamed foams to be added to the slurry is the amount necessary to obtain a hardened product having an air-dried specific gravity of from 0.4 to 1.5.

2. The method according to claim 1, wherein said slag fine powder is a slag fine powder which is obtained by classification after milling of a blast furnace granulated slag.

3. The method according to claim 1, wherein said calcium aluminate is CA, $CA_2$, $C_3A$, $C_{12}A_7$, $C_{11}A_7 \cdot CaF_2$ or mixtures thereof.

4. The method according to claim 1, wherein said gypsum fine powder has a fineness of not smaller than 2,500 $cm^2/g$ in terms of Blaine's specific area.

5. The method according to claim 1, wherein when molded, said slurry is applied with vibrations at a frequency of 100 to 10,000 V.P.M.

6. The method according to claim 1, wherein when molded, compressed air is blown against the slurry.

7. The method according to claim 1, wherein said slurry sets and hardens within 3 to 60 minutes after the molding and can be immediately removed from a mold and worked.

8. The method according to claim 1, wherein the steam curing temperature is not higher than 90° C. and the curing is effected at not less than 150° C. . hour.

9. A method of making a fiber-reinforced slag gypsum cement lightweight hardened product which consist essentially of the steps of:

adding from 5 to 140 parts by weight of aggregates having a maximum size of not larger than 2000 μm to 100 parts by weight of a mixture which comprises 100 parts by weight of Portland cement, from 20 to 350 parts by weight of slag fine powder, from 0 to 20 parts by weight of lime, and from 20 to 100 parts by weight of calcium aluminate and gypsum fine powder in total$_L$ provided that a ratio by weight of the gypsum fine powder and the calcium aluminate is in the range of 0.5 to 2.0:1;

adding from 0.01 to 1.5 parts by weight of a setting retardant to the mixture;

mixing water, foaming agent and reinforcing fibers with the mixture to obtain a slurry;

subjecting the slurry to molding to obtain a molded product;

removing the molded product to obtain a hardened product; and curing the hardened product with steam;

wherein the amount of the foaming agent to be added to the slurry is the amount necessary to obtain a hardened product having an air-dried specific gravity of from 0.4 to 1.5.

10. The method according to claim 9, wherein said slag fine powder is a slag fine powder which is obtained by classification after milling of a blast furnace granulated slag and which has a fineness ranging from 6,000 to 12,000 $cm^2/g$ as Blaine's specific surface area.

11. The method according to claim 9, wherein said calcium aluminate is CA, $CA_2$, $C_3A$, $C_{12}A_7$, $C_{11}A_7 \cdot CaF_2$ or mixtures thereof.

12. The method according to claim 9, wherein said gypsum fine powder has a fineness of not small than 2,500 $cm^2/g$ in terms of Blaine's specific surface area.

13. The method according to claim 9, wherein during molding said slurry is subjected to vibrations at a frequency of 100 to 10,000 V.P.M.

14. The method according to claim 9, wherein during molding compressed air is blown against the slurry.

15. The method according to claim 9, wherein said slurry sets and hardens within 3 to 60 minutes after said molding step and is immediately removed from the mold and worked.

16. The method according to claim 9, wherein the steam curing temperature is not higher than 90° C. and the curing is effected at not less than 150° C. . hour.

* * * * *